United States Patent Office

3,641,084
Patented Feb. 8, 1972

3,641,084
VINYLIC ALUMINACYCLOALKANE COMPOUNDS AND THEIR PREPARATION
Lawrence H. Shepherd, Jr., Baton Rouge, La., assignor to Ethyl Corporation, New York, N.Y.
No Drawing. Filed May 5, 1969, Ser. No. 821,954
Int. Cl. C07f 5/06
U.S. Cl. 260—448 A 46 Claims

ABSTRACT OF THE DISCLOSURE

Organoaluminum compounds possessing a vinylic alumina-cycloalkane moiety are described. These are prepared by reacting a nonionic organoaluminum compound possessing an aluminacyclo-alkene moiety with an olefinic reactant in the presence of a stable Lewis base. The compound possessing the aluminacycloalkene moiety may be used in preformed condition or it may be formed in situ during the course of a one-step reaction. The compounds possessing the vinylic aluminacycloalkane moiety yield alpha-olefinic compounds on hydrolysis.

---

This invention relates to cyclic organoaluminum compounds, their synthesis and their use in the synthesis of olefinic compounds. More particularly, this invention relates to compounds in which an aluminum atom is part of a saturated ring system carrying a vinylic substituent.

BACKGROUND

In copending application Ser. No. 771,651, filed Oct. 29, 1968, it is shown that nonionic organoaluminum compounds possessing an aluminacycloalkene moiety are produced by causing interaction among aluminum, a conjugated diene and a hydrocarbon aluminum hydride in the presence of a Lewis base capable of complexing with the nonionic organoaluminum compound without undergoing excessive cleavage. For example, when the diene reactant is butadiene or butadiene substituted in the two position or in the two and three positions, the principal product produced is characterized by the formula:

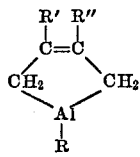

wherein R is a hydrocarbon group having up to about 18 carbon atoms, R' is a hydrogen, alkyl or alkenyl group; and R'' is a hydrogen or alkyl group.

This invention involves, inter alia, the discovery that the aluminacycloalkene compounds described in the above copending application react with olefins and thereby produce another class of cyclic aluminum compounds. The reaction in question involves the 1:1 molecular addition as between the aluminacycloalkene moiety and the olefin. Thus the addition reaction is not the same as the addition reaction which trialkylaluminum compounds undergo on reaction with an olefin such as ethylene (see Ziegler and Gellert U.S. 2,826,598). Instead the reaction of the present invention involves addition and rearrangement whereby the products are compounds in which an aluminum atom is part of a saturated ring system carrying a vinylic substituent.

Thus, in one embodiment this invention provides a process of preparing organoaluminum compounds in which an aluminum atom is part of a saturated ring system carrying a vinylic substituent which comprises reacting a nonionic organoaluminum compound possessing an aluminacycloalkene moiety with an olefin in the presence of a stable Lewis base—i.e., a Lewis base not susceptible to excessive cleavage during the course of the reaction. Exemplary of such Lewis bases are the tertiary amines, dialkyl ethers, cycloparaffinic monoethers having a six membered ring, and cycloparaffinic diethers having a five or six membered ring.

Another aspect of this invention is the discovery that it is not necessary to preform the aluminacycloalkene reactant prior to introducing the olefinic reactant. The process may be conducted in one step so that the aluminacycloalkene moiety is formed in situ and as soon as it is formed, it reacts with the olefin to form the cyclic compounds of this invention. For example, a preferred one-step process involves effecting reaction among aluminum (preferably, activated aluminum), a conjugated diene, a hydrocarbon aluminum hydride, and an olefin in the presence of a stable Lewis base, such as those previously noted. Another one-step process involving in situ preparation and reaction of the aluminacycloalkene moiety comprises effecting reaction among aluminum, a conjugated diene, hydrogen, an olefin and an alkali metal aluminum tetrahydrocarbyl:

$$MAlR_4$$

where M is alkali metal (Li, Na, K, Rb, Cs) and the R groups may be the same or different and are hydrocarbyl groups, each of which may contain up to about 18 carbon atoms. This one-step reaction is likewise conducted in the presence of a stable Lewis base such as those referred to above.

The alkali metal aluminum tetrahydrocarbyl may itself be formed in situ during the course of the over-all reaction. For example, substitution of an alkali metal aluminum tetrahydride (e.g., sodium aluminum tetrahydride) for the alkali metal tetrahydrocarbyl will result in the in situ formation of alkali metal aluminum tetrahydrocarbyl via the reaction:

$$MAlH_4 + 4\ \text{olefin} \rightarrow MAlR_4$$

Another way by which the alkali metal aluminum tetrahydrocarbyl may be formed in situ during the over-all reaction involves introducing into the system alkali metal or, preferably, an alkali metal hydride instead of the alkali metal aluminum tetrahydrocarbyl. In this case the alkali metal aluminum tetrahydrocarbyl is formed in situ via reactions such as the following:

$$M + \tfrac{1}{2} H_2 \rightarrow MH$$
$$Al + \tfrac{3}{2} H_2 + 3\ \text{olefin} \rightarrow R_3Al$$
$$R_3Al + MH \rightarrow MAlR_3H$$
$$MAlR_3H + \text{olefin} \rightarrow MAlR_4$$

In conducting the concurrent reaction sequences just described, the inclusion in the reaction system of trihydrocarbyl aluminum or dihydrocarbyl aluminum hydride proves beneficial in accelerating the rates of some of these reactions.

Thus, another of the various over-all reaction systems for forming the aluminacycloalkene moiety in situ and concurrently reacting the same with the olefin to form the vinylic aluminacycloalkane moiety involves charging the system with aluminum (preferably, activated aluminum); a conjugated diene; an alkali metal or, preferably, an alkali metal hydride (e.g., NaH); hydrogen; and an olefin, all in the presence of a stable Lewis base of the type referred to above. When reaction is caused among these materials the aluminacycloalkene moiety is formed and reaction thereof with the excess olefin is engendered.

A preferred way of forming alkali metal aluminum tetrahydrocarbyl in situ is to introduce alkali metal (most preferably, sodium) and trihydrocarbyl aluminum (most preferably, trialkylaluminum) into the system. The following reaction occurs:

$$4 R_3Al + 3M \rightarrow 3 MAlR_4 + Al$$

The most desirable olefins for use in forming the novel compounds of this invention are the alpha-olefins and the polycyclic compounds having at least one endocyclic double bond. As a general rule, these olefinic compounds are quite reactive toward the aluminacycloalkene moiety, especially at elevated temperatures (e.g., 100–200° C.). On the other hand, internal olefins and monocyclic olefins are not particularly reactive toward the aluminacycloalkene moiety. The suitability of any given olefinic compound can readily be ascertained by a pilot experiment using, for example, the procedures of Examples I and II hereinafter. Exemplifications of suitable alpha-olefins and polycyclic compounds having one or more endocyclic double bonds are presented hereinafter.

The cyclic organoaluminum compounds provided by this invention possess a vinylic aluminacycloalkane moiety. For example, when the initial organoaluminum reactant contains the 3,4-dimethyl-aluminacyclopent-3-ene moiety (or when the diene reactant in a one-step process is 2,3-dimethyl butadiene) and when the olefin reactant is ethylene, the resultant organoaluminum compound will contain the 3-isopropenyl-3-methyl aluminacyclopentane moiety (i.e., the 3-isopropenyl-3-methyl-1-aluminacyclopent-1-yl radical):

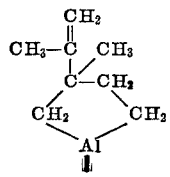

In other words two-thirds of a chemical equivalent or aluminum is directly involved in forming a paraffinic ring system carrying a vinylic substituent.

The remaining valence bond of the aluminum atom apparently carries, at least for the most part, a hydrocarbon group corresponding to that present in the hydrocarbon aluminum hydride or alkali metal aluminum tetrahydrocarbyl used in synthesizing the aluminacycloalkene compound. By way of illustration, when the diene reactant used to form the aluminacycloalkene moiety is butadiene or butadiene substituted on either or both of the internal carbon atoms and the olefin reactant is ethylene or a mono-substituted ethylene, the principal product produced may be represented by the formula:

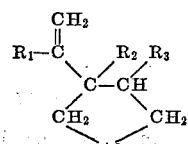

wherein R is a hydrocarbon group having up to about 18 carbon atoms (most preferably a lower alkyl group), and in the simplest cases $R_1$ is hydrogen or an alkyl or alkenyl group, $R_2$ is hydrogen or an alkyl group, and $R_3$ is hydrogen or an alkyl, aryl or aralkyl group. For all practical purposes the identity of R is of academic interest only inasmuch as the vinylic aluminacycloalkane moiety is by far the most novel and most useful segment of the over-all molecule. Since it is convenient to utilize diisobutyl aluminum hydride in the synthesis of the compounds, R will frequently be isobutyl.

When the diene reactant used to form the aluminacycloalkene compound is butadiene or butadiene substituted on either or both of the internal carbon atoms and the olefin reactant is a di-substituted ethylene $$(R_3R_4C = CH_2)$$

the principal product produced in accordance with this invention may be represented by the formula:

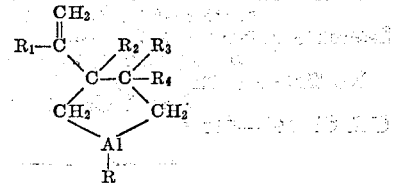

wherein, in the simplest cases, R, $R_1$, and $R_2$ are as defined above, $R_3$ is an alkyl, aryl or aralkyl group and $R_4$ is an alkyl group.

When the olefinic reactant is a polycyclic compound having at least one endocyclic double bond the compound of this invention possesses a vinylic aluminacycloalkane moiety having a multiple ring system. For example, reaction between a bicyclic or tricyclic olefin having the formula:

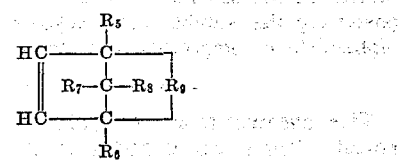

and an aluminacycloalkene moiety (derived from butadiene or butadiene substituted on either or both of the internal carbon atoms) gives rise to the following multiple ring-containing products of this invention:

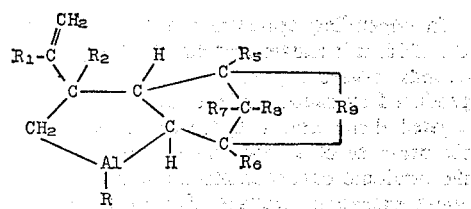

wherein, in the simplest situations, R, $R_1$, and $R_2$ have the meanings assigned to them hereinabove; each of $R_5$, $R_6$, $R_7$ and $R_8$ is, individually, hydrogen or an alkyl group; and $R_9$ is a divalent hydrocarbon radical, normally from one to three carbon atoms in length and containing from one to about ten carbon atoms.

Other compounds of this invention will become apparent from the ensuing description.

There is a marked tendency for the cyclic aluminum compounds of this invention to form complexes with Lewis bases such as amines, ethers, thioethers, and the like. These complexes, especially when the Lewis base is a tertiary amine, dialkyl ether, cycloparaffinic monoether having a six membered ring or cycloparaffinic diether having a five or six membered ring, constitute preferred embodiments of this invention.

The cyclic aluminum compounds of this invention are nonionic. They are usually soluble in conventional aliphatic and aromatic hydrocarbon solvents such as benzene.

Inasmuch as the formation of the cyclic aluminum compounds of this invention involves an addition/rearrangement reaction, it is helpful to consider how these operations take place. In this way, it is easier to visualize what materials should be utilized in order to obtain the desired end product. It will be understood and appreciated, however, that the following is merely a simplified representation conforming to the experimental facts and observations. No attempt is made herein to describe the precise reaction mechanism.

For the purpose of illustration, consideration shall be given first to the reaction between the aluminacyclopent- 3-ene moiety and propylene. In this case the addition and the rearrangement can be depicted (using al to represent two-thirds of an equivalent of aluminum) as follows:

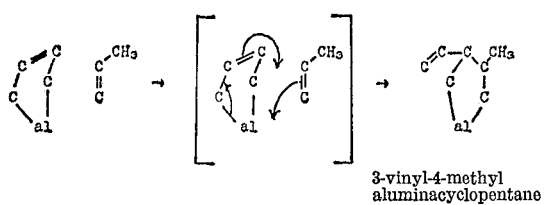

3-vinyl-4-methyl aluminacyclopentane

It will be noted that Markownikoff addition of substituted ethylenes is favored. It will also be noted that inasmuch as the aluminacycloalkene moiety is symmetrical, it matters not which of the allylic carbon atoms participates in the addition reaction.

The addition of alpha-olefin to an unsymmetrical aluminacycloalkene moiety (i.e., one in which at least one of the allylic carbon atoms carries a substituent other than the H atom and if both do, the substituents are different from each other) presents a somewhat more complicated situation. In particular, the possibility exists for different products to be formed, this in turn being dependent upon which allylic carbon atom of the moiety is involved in the addition. This may be illustrated by the reaction between ethylene and the 3-ethyl-aluminacyclopent-3-ene moiety:

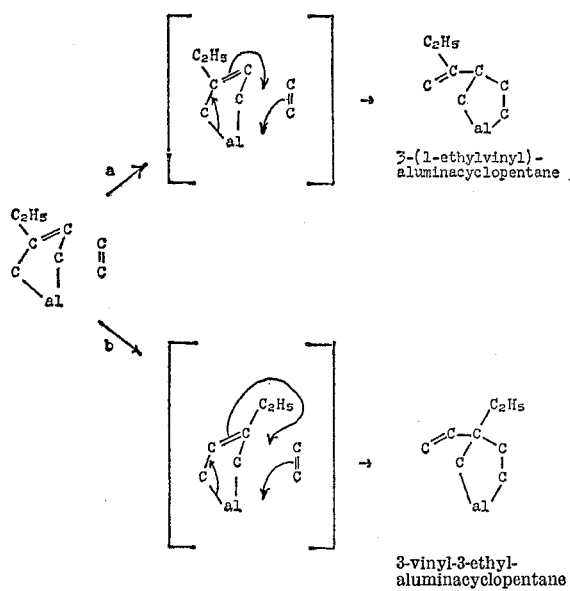

3-(1-ethylvinyl)-aluminacyclopentane 3-vinyl-3-ethyl-aluminacyclopentane

In actual practice it has been found that both types of additions occur but that because of steric considerations addition via the least substituted allylic carbon atom predominates. Thus, reaction via path *a* occurs to a greater extent than via path *b*.

The cyclic aluminum compounds of this invention may be readily hydrolyzed with water or with aqueous mineral acids or bases whereby olefins are produced. These olefins have the skeletal configurations of the hydrocarbon portion of the vinylic aluminacycloalkane moiety present in the compound being hydrolyzed. However, the conditions used in effecting the hydrolysis can cause some double bond isomerization to occur. As a general proposition the milder the hydrolysis conditions (e.g., water at low temperatures) the less likely it is that such isomerization will occur.

In order to still further appreciate the practice and advantages of this invention reference should be had to the following illustrative examples.

EXAMPLE I

Reaction among aluminum, isoprene, diisobutylaluminum hydride, and ethylene

Activated aluminum powder (370 mmoles), 1,4-dioxane (1,230 mmoles), isoprene (150 mmoles) and diisobutylaluminum hydride (25 mmoles) were charged into an autoclave. The system was then pressurized with ethylene and the system caused to react at 800 p.s.i. ethylene pressure for two hours at 150° C. After cooling down the reaction product, a portion was hydrolyzed with water followed by aqueous HCl at 0 to 25° C. Very little isopentene was liberated. The major products evolved on hydrolysis as identified by vpc and mass spectrographic analyses were two isomers having the empirical formula $C_7H_{14}$. These isomers were present in a 3:1 ratio. The major $C_7H_{14}$ isomer was isolated by preparative vpc techniques using a 10' x ¼" dibenzyl ether column. The NMR spectrum of this isomer was found to be identical to an authentic sample of 2,3-dimethyl pentene-1. Another portion of the reaction product was treated with $D_2SO_4/D_2O$ and the major deuterated isomer was isolated and its NMR spectrum obtained in the same fashion. This established that the major isomer was dideuterated and that deuteration occurred in the 3-methyl and in the 5 positions of 2,3-dimethyl pentene-1. The minor isomer produced on hydrolysis was shown via NMR characterization to be 3,3-dimethyl pentene-1. Therefore the major cyclic aluminum product formed in the reaction contained the 3-isopropenyl aluminacyclopentane moiety:

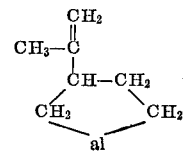

The minor cyclic aluminum product contained the 3-vinyl-3-methyl aluminacyclopentane moiety:

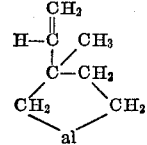

When the procedure of Example I is repeated substituting butadiene for the isoprene the cyclic aluminum product contains the 3-vinyl aluminacyclopentane moiety. On hydrolysis, 3-methyl pentene-1 is obtained.

EXAMPLE II

Reaction between 1-isobutyl-3-methyl alumina-cylopent-3-ene dioxanate and ethylene The aluminacyclopent-3-ene complex used in this reaction was prepared by reaction of aluminum metal (365 mmoles), isoprene (150 mmoles), diisobutylaluminum hydride (31 mmoles), and 1,4-dioxane (1.23 moles) at 150° C. for two hours. A sample of the resultant liquid reaction product (separated from the unreacted aluminum powder by decantation) was placed in an autoclave and heated to 150° C. under 800 p.s.i. ethylene pressure for two hours. Deuterolysis of an aliquot of the reaction mixture liberated two dideuterated $C_7$ olefinic hydrocarbons in an approximately 4:1 ratio. These isomers had V.P.C. retention times identical with the $C_7H_{14}$ compounds obtained in Example I. The major component of the present reaction product was separated by preparative V.P.C. and identified by NMR spectrography as dideuterated 2,3-dimethyl pentene-1. The minor isomer was 3,3-dimethyl pentene-1. Thus as in Example I the major cyclic aluminum product contained the 3-isopropenyl-aluminacyclopentane moiety and the minor product contained the 3-vinyl-3-methyl aluminacyclopentane moiety.

Further, these results indicate that in the reaction of Example I the 3-methyl-aluminacyclopent-3-ene moiety was formed in situ and converted to the 3-vinylic aluminacyclopentane moieties characteristic of the preferred products of this invention.

Repetition of the procedure of Example II substituting styrene for ethylene gives rise to the formation as the major product of the 3-isopropenyl-4-phenyl aluminacyclopentane moiety:

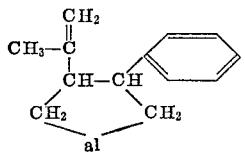

Also, a small amount of the 3-vinyl-3-methyl-4-phenyl aluminacyclopentane moiety is formed:

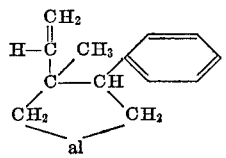

On hydroylsis, these two compounds give, respectively, 2,3-dimethyl-4-phenyl pentene-1 and 3,3-dimethyl-4-phenyl pentene-1.

Similarly, reaction between 1-isobutyl aluminocyclopent-3-ene dioxanate and isobutylene gives rise to the formation of the 3-vinyl-4,4-dimethyl-aluminocyclopentane moiety:

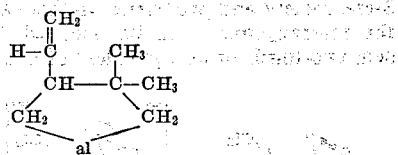

On hydrolysis, 3,4,4-trimethyl pentene-1 is liberated.

EXAMPLE III

Reaction among aluminum, isoprene, sodium aluminum tetraethyl, hydrogen, and ethylene An autoclave is charged with aluminum powder (365 mmoles), 1,4-dioxane (1,230 mmoles), isoprene (150 mmoles) and sodium aluminum tetraethyl (12 mmoles). The system is then pressurized with ethylene to 200 p.s.i. and then hydrogen is introduced into the system to raise the total pressure to 600 p.s.i. Thereupon the sealed autoclave is heated to 150° C. and held at this temperature for three hours. As in Examples I and II above, the major cyclic aluminum product produced contains the 3-isopropenyl-aluminacyclopentane moiety and the minor product contains the 3-vinyl-3-methyl-aluminacyclopentane moiety. However in this instance the third bond of the aluminum of these moieties is satisfied by an ethyl group rather than an isobutyl group. Hydrolysis of the product yields a mixture of 2,3-dimethyl pentene-1 and 3,3-dimethyl pentene-1, with the former predominating.

Other typical reactions and products of this invention are summarized in the ensuing table. It is to be noted that the diene identified in the left hand column may be utilized directly in a one-step process or it may be used to perform the corresponding aluminacyclopent-3-ene reactant via the process described in detail in copending application Ser. No. 771,651, filed Oct. 29, 1968, all disclosure of which is incorporated herein as if fully set forth in this specification. The olefinic products identified in the right hand column of the ensuing table are those which are liberated on careful hydrolysis such that double bond isomerization is not encountered. In those cases where the diene is unsymmetrical so that two reaction paths are possible, the principal aluminacycloalkane moiety and corresponding olefin are presented first.

TABLE

| Diene | Alpha-olefin | Aluminacycloalkane moiety | Olefinic product on hydrolysis |
| --- | --- | --- | --- |
| Butadiene | Butene-1 | 3-vinyl-4-ethyl aluminacyclopentane | 3,4-dimethyl hexene-1. |
| Do | Allyldiphenylcarbinol (as the aluminum salt). | 3-vinyl-4-(2,2-diphenyl-2-hydroxyethyl)-aluminacyclopentane. | 2,3-dimethyl-pent-4-enyl diphenylcarbinol. |
| Do | p-Methoxy styrene | 3-vinyl-4-(p-methoxypenyl)-aluminacyclopentane. | p-(1,2-dimethyl-but-3-enyl) anisole. |
| Isoprene | Propylene | 3-isopropenyl-4-methylaluminacyclopentane. | 2,3,4-trimethyl pentene-1. |
|  |  | 3-vinyl-3,4,-dimethylaluminacyclopentane. | 3,3,4-trimethyl pentene-1. |
| Do | 3-methyl butene-1 | 3-isopropenyl-4-isopropylaluminacyclopentane. | 2,3,4,5-tetramethyl hexene-1. |
|  |  | 3-vinyl-3-methyl-4-isopropylaluminacyclopentane. | 3,3,4,5-tetramethyl hexene-1. |
| Do | 4-vinyl cyclohexene | 3-isopropenyl-4-(3-cyclohexenyl)-aluminacyclopentane. | 4-(1,2,3-trimethyl-but-3-enyl) cyclohexene. |
|  |  | 3-vinyl-3-methyl-4-(3-cyclohexenyl)-aluminacyclopentane. | 4-(1,2,2,-trimethyl-but-3-enyl) cyclohexene. |
| 2,3-dimethyl butadiene | Octene-1 | 3-isopropenyl-3-methyl-4-hexyl aluminacyclopentane. | 2,3,3,4-tetramethyl decene-1. |
| Do | Styrene | 3-isopropenyl-3-methyl-4-phenyl aluminacyclopentane. | 1,2,2,3-tetramethyl-but-3-enyl benzene. |
| Do | 2-methyl hexadiene-1,5 | 3-isopropenyl-3-methyl-4-(3-methyl-but-3-enyl)-aluminacyclopentane. | 2,3,3,4,7-pentamethyloctadiene-1,7. |
| 2-ethyl butadiene | Vinylcyclohexane | 3-(1-ethylvinyl)-4-cyclohexylaluminacyclopentane. | 1,2-dimethyl-3-ethyl-but-3-enyl cyclohexane. |
|  |  | 3-vinyl-3-ethyl-4-cyclohexylaluminacyclopentane. | 1,2-dimethyl-2-ethyl-but-3-enyl cyclohexane. |
| Do | 4-methyl pentene-1 | 3-(1-ethylvinyl)-4-isobutylaluminacyclopentane. | 2-ethyl-3,4,6-trimethyl heptene-1. |
|  |  | 3-vinyl-3-ethyl-4-isobutylaluminacyclopentane. | 3-ethyl-3,4,6-trimethyl heptene-1. |
| Do | Allyl benzene | 3-(1-ethylvinyl)-4-benzylaluminacyclopentane. | 2,3-dimethyl-4-ethyl-pent-4-enyl benzene. |
|  |  | 3-vinyl-3-ethyl-4-benzylaluminacyclopentane. | 2,3-dimethyl-3-ethyl-pent-4-enyl benzene. |
| Myrcene | Ethylene | 3-[1-(4-methyl-pent-3-enyl)vinyl]-aluminacyclopentane. | 2-sec-butyl-6-methylheptadiene-1,5. |
|  |  | 3-vinyl-3-(4-methyl-pent-3-enyl)-aluminacyclopentane. | 3,7-dimethyl-3-ethyloctadiene-1,6. |
| Do | Propylene | 3-[1-(4-methyl-pent-3-enyl)vinyl]-4-methyl-aluminacyclopentane. | 2-(1,2-dimethylpropyl)-6-methyl heptadiene-1,5. |
|  |  | 3-vinyl-3-(4-methyl-pent-3-enyl)-4-methyl-aluminacyclopentane. | 3,7-dimethyl-3-sopropyloctadiene-1,6. |

For a further appreciation of reactions and products of this invention involving the provision of organoaluminum compounds possessing a vinylic fused ring aluminacycloalkane moiety reference should be had to the following exemplifications. In the illustrative examples where an unsymmetrical aluminacryloalkene moiety is subjected to reaction so that two reaction products are possible, only the principal fused ring aluminacycloalkane moiety is presented.

(1) Reaction between the aluminacyclopent-3-ene moiety

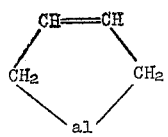

and bicyclo[2.2.1]hept-2-ene (2-norbornene)

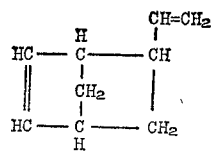

results in the formation of the 5-vinyl-3-aluminatricyclo [5.2.1.0$^{2,6}$]-decane moiety:

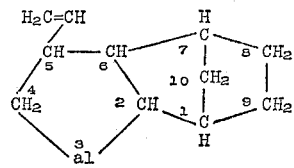

(2) Reaction between the 3-methyl-aluminacyclopent-3-ene moiety

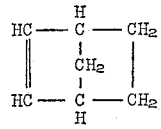

and 1,7,7-trimethylbicyclo[2.2.1]hept-2-ene (bornylene)

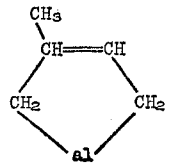

results in the formation of the 5-isopropenyl-7,10,10-trimethyl-3-aluminatricyclo[5.2.1.0$^{2,6}$]-decane moiety:

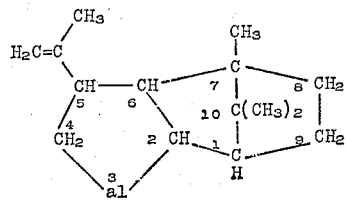

(3) Reaction between the 3-ethyl-aluminacyclopent-3-ene moiety

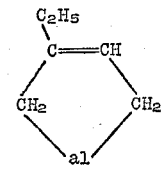

and 5-vinyl-bicyclo[2.2.1]hept-2-ene

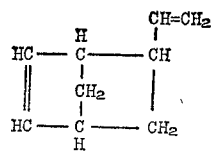

results in the formation of the 5-(1-ethylvinyl)-8-vinyl-3-aluminatricyclo[5.2.1.0$^{2,6}$]-decane moiety;

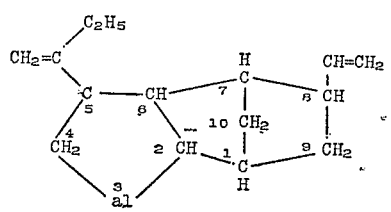

(4) Reaction between 3-(4-methyl-3-pentenyl)-aluminacyclopent-3-ene moiety

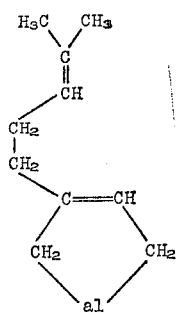

and bicyclo[2.1.0]pent-2-ene

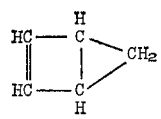

results in the formation of the 4-[1-(4-methyl-pent-3-enyl)vinyl]-2-aluminatricyclo[3.3.0.0$^{6,8}$]-octane moiety:

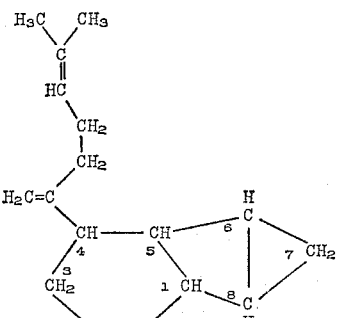

(5) Reaction between the 3,4-dimethyl-aluminacyclopent-3-ene moiety

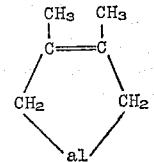

and cyclopentadiene dimer

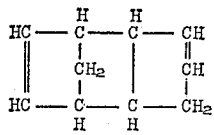

results in the formation of the 5-methyl-5-isopropenyl-3-aluminatetracyclo[5.5.1.0$^{2,6}$.0$^{8,12}$]tridec - 9 - ene and the 5 - methyl - 5 - isopropenyl - 3 - aluminatetracyclo-[5.5.1.0$^{2,6}$.0$^{8,12}$]tridec-10-ene moieties:

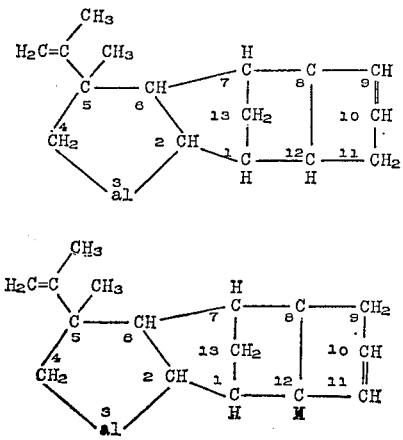

As will now be clearly evident, the present invention may be successfully applied to a wide variety of reactants in order to form a wide variety of nonionic organoaluminum compounds possessing at least one vinylic aluminacycloalkane moiety. It may be helpful to further consider some additional details concerning the practice of this invention and its several embodiments.

(A) Preformation of nonionic organoaluminum compounds possessing aluminacycloalkene moiety As noted above and in copending application Ser. No. 771,651, interaction among aluminum, a conjugated diene and a hydrocarbon aluminum hydride in the presence of a Lewis base capable of complexing with the resultant organoaluminum compound without undergoing excessive cleavage is one way by which nonionic organoaluminum compounds having the aluminacycloalkene moiety may be produced.

The diene reactant used in this process is preferably a conjugated diene hydrocarbon having from 4 to about 18 carbon atoms in the molecule, and is exemplified by such substances as butadiene, isoprene, 2,3 - dimethyl butadiene, 2 - ethyl butadiene, myrcene, 1,4 - dimethyl butadiene, 1,4-diphenyl butadiene, 2-phenyl butadiene, alpha-phellandrene, and the like. Also, the diene may be substituted by innocuous radicals as in the case of chloroprene and 2,3-dichlorobutadiene. Dienes wherein the double bonds are in the terminal positions are usually most suitable.

The hydrocarbon aluminum hydride reactant used in the process may be a dihydrocarbyl aluminum hydride ($R_2AlH$) in which the R groups are hydrocarbyl groups (alkyl, aryl, cycloalkyl, alkenyl, aralkyl, alkaryl, etc.).

Thus use may be made of such compounds as dimethylaluminum hydride, diethylaluminum hydride, dipropylaluminum hydride, dibutylaluminum hydride, diisobutylaluminum hydride, dioctylaluminum hydride, dioctadecylaluminum hydride, diphenylaluminum hydride, ditolylaluminum hydride, dicumenylaluminum hydride, cyclohexylaluminum hydride, dimethylcyclohexyl aluminum hydride, diallylaluminum hydride, dibenzylaluminum hydride, diphenethylaluminum hydride and the like. It is generally preferable to utilize a dialkylaluminum hydride, especially those having alkyl groups containing up to about 18 carbon atoms. The most preferred compounds are the dialkylaluminum hydrides in which each alkyl group is a lower alkyl group and thus contains up to about 6 carbon atoms. If desired, the hydrocarbon aluminum hydride may be generated in situ by initially reacting aluminum with trihydrocarbyl aluminum (e.g., triethylaluminum) under a hydrogen atmosphere according to known technology.

The aluminum used in the process may be in the form of chips, turnings, powder, or other similar particulated states. It is definitely preferable to employ activated aluminum. Methods for producing activated aluminum are standard and well known in the art. For further details, reference may be had, for example, to U.S. 2,885,314; 2,892,738; 2,921,876; 3,100,786 and 3,104,252.

This reaction is conducted in the presence of a Lewis base having suitable chemical stability under the reaction conditions being utilized. In most cases this Lewis base will be employed as the principal reaction solvent—i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a suitable amount of the Lewis base is also present in the reaction system. Ordinarily the system should contain at least 1–2 mols of Lewis base per mol of diene employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclidine, and the like); dialkyl ethers (e.g., dimethyl ether, diethyl ether, diisopropyl ether, methylisoamyl ether, dibutyl ether, dihexyl ether and the like); cycloparaffinic monoethers having a six membered ring (e.g., tetrahydropyran—pentamethylene oxide—and ring alkylated derivatives thereof); and cycloparaffinic diethers having a five or six membered ring (e.g., 1,4-dioxane, 1,3-dioxolane, 2-methyl-2-ethyl-1,3-dioxolane; and the like); and other similar substances which tend not to be excessively cleaved in the reaction, such as dicyclohexyl ether, dibenzyl ether, and the like.

The relative proportions of the reactants and reaction diluents do not appear to be critical as long as there is present a sufficient amount of each reactant to participate in the reaction.

In conducting the process for preforming the cyclic organoaluminum compounds for subsequent use in accordance with this invention, elevated temperatures are employed. Generally, temperatures within the range of about 100° C. to about 180° C. will be found satisfactory, temperatures within the range of about 130 to about 150° C. being preferred. Naturally one should select a reaction temperature at which excessive cleavage of the Lewis base does not occur.

Ordinarily the reaction will be conducted at atmospheric pressure or at the ambient pressures encountered when conducting the reaction in a closed reaction vessel. However, when using some of the lower boiling Lewis base solvents, e.g., dimethyl ether, trimethyl amine or the like, it is desirable to conduct the reaction at a high enough pressure to keep the system in the liquid state of aggregation. Thus pressures up to about 50 atmospheres may be employed.

It will of course be understood that the reaction mixture should be kept essentially anhydrous and that exposure of the reaction system to air should be kept at a minimum.

The period of time during which the reactants interact with each other is susceptible to considerable variation and is generally discretionary. In general, the higher the reaction temperature, the shorter the reaction or contact time.

Exemplary of the comounds which may be preformed in the above manner are 1-isobutyl-3-methyl-aluminacyclopent-3-ene diethyl etherate;
1-isobutyl-3-methyl-aluminacyclopent-3-ene tetrahydropyranate;
1-isobutyl-3-methyl-aluminacyclopent-3-ene N-methylpyrrolidinate;
1-isobutyl-3-methyl-aluminacyclopent-3-ene dioxanate;
1-isobutyl-3-ethyl-aluminacyclopent-3-ene dioxanate;
1-isobutyl-aluminacyclopent-3-ene-dioxanate;
1-isobutyl-3-(4-methyl-3-pentenyl)-aluminacyclopent-3-ene dioxanate;
1-ethyl-3-methyl-aluminacyclopent-3-ene dioxanate;
1-phenyl-3-methyl-aluminacyclopent-3-ene dioxanate;
and the like.

(B) Reaction of olefins with preformed nonionic organoaluminum compounds processing an aluminacycloalkene moiety It has been pointed out above that any of a wide variety of reactive olefins may be used in forming the novel products of this invention. In other words, any olefin coreactive with (i.e., capable of adding to) the alumina cycloalkene moiety is suitable. Ordinarily the alpha-olefins and the polycyclic compounds having one or more endocyclic double bonds comprise that most useful types of olefinic reactants. Suitable alpha-olefinic hydrocarbons which may be used include ethylene, propylene, butene-1, isobutylene, pentene-1, 2-methylbutene-1, 3-methylbutene-1, hexene-1, 2-methylpentene-1, 3-methylpentene-1, 4-methylpentene-1, 2,3-dimethylbutene-1, 3,3-dimethylbutene-1, and similar higher homologous compounds such as the 1-heptenes, 1-octenes, 1-decenes, 1-dodecenes, 1-tetradecenes, 1-hexadecenes, 1-octadecenes, and the like. Thus in general the acyclic olefin reactant for the present process will have the formula

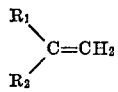

where $R_1$ is hydrogen or an alkyl group of up to about 16 carbon atoms and $R_2$ is hydrogen or methyl. Generally speaking, the lower alpha-olefinic hydrocarbons tend to be more reactive than the higher members and thus the use of alpha-olefinic hydrocarbons, especially vinyl olefins, containing up to about eight carbon atoms in the molecule is preferred. Alpha-olefinic hydrocarbons carrying a cyclic substituent, such as styrene, alpha-methyl styrene, vinyl cyclohexane, p-methyl styrene, allylbenzene, vinyl cyclohexene, and the like are also suitable. Other suitable olefins include the polycyclic compounds having an exocyclic double bond such as, for example, dibenzofulvene; 2,3-diphenyl benzofulvene; as well as dibiphenylene polyenes such as 1,4-dibiphenylene-1,3-butadiene and 1,6-dibiphenylene-1,3,5-hexatriene.

The use of ethylene is particularly preferred as it undergoes the desired addition reactions quite readily and produces the addition products in good yield.

Suitable polycyclic compounds having at least one endocyclic double bond comprise an extensive class of compounds possessing a highly reactive double bond by virtue of the fact that it is a bridge of a polycyclic compound and is in proximity to another bridge structure. As a consequence, the molecule may be considered as a molecule having an internal strain. For example, use may be made of such compounds as bicyclo[2.1.0]pent-2-ene;
bicycle[3.2.0]hept-6-ene;
bicyclo[2.2.1]hept-2-ene (2-norbornene);
2,3-dimethylbicyclo[2.2.1]hept-2-ene;
1,3,3-trimethylbicyclo[2.2.1]hept-5-ene;
1,7,7-trimethylbicyclo[2.2.1]hept-2-ene (bornylene);
2,2,5-trimethylbicyclo[2.2.1]hept-5-ene;
7,7-dimethylbicyclo[2.2.1]hept-2-ene (apobornylene);
3,3-dimethylbicyclo[2.2.1]hept-5-ene (camphenylene);
2,3-dimethylbicyclo[2.2.1]hept-2-ene (santene);
bicyclo[2.2.2]oct-2-ene;
bicyclo[3.2.2]non-6-ene;
2-methylbicyclo[2.2.2]oct-5-ene;
6-methylbicyclo[3.2.2]non-6-ene;
bicyclo[8.2.2.]tetradec-11-ene;
tricyclo[3.2.2$^{2,4}$]non-6-ene;
3,3-dimethyl-2-methylene-bicyclo[2.2.1]hept-5-ene (isocamphodiene);
5-ethylidenebicyclo[2.2.1]hept-2-ene;
cyclopentadiene dimer;
methylcyclopentadiene dimer;
butylcyclopentadiene dimer;
phenylcyclopentadiene dimer;
bicyclo[2.2.1]hepta-2,5-diene (norbornadiene);
bicyclo[2.2.2]octa-2,5,7-triene;
tricyclopentadiene; and the like.

Thus, among the categories of reactants of this type are the polycyclic hydrocarbons containing at least one etheno bridge. These may be represented by the formulas:

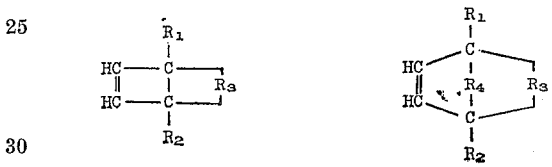

an $R_4$ bridge one carbon atom in length (i.e., methylene, wherein, in the simplest cases, $R_1$ and $R_2$ are independently, hydrogen or lower alkyl groups; $R_3$ is a divalent cyclic or acyclic hydrocarbon radical (i.e., a hydrocarbylene group) which may contain from 1 to about 18 carbon atoms and which normally, but not necessarily, is from 1 to 3 carbon atoms in length; and $R_4$ is an alkylene or alkenylene group which may contain from 1 to about 18 carbon atoms and which normally is from 1 to 3 carbon atoms in length. Of these, the compounds containing an $R_4$ bridge one carbon atom in length (i.e., methylene, monoalkyl substituted methylene and dialkyl substituted methylene) are preferred because of their high reactivity, ready availability and relatively low cost.

The presence of substituents in the olefinic reactant is not prejudicial provided the substituents are sufficiently inert as not to interfere with its reactivity. Thus, the presence in the olefinic reactant of innocuous substituents such as trimethylsilyl, triethylsilyl, triphenylsilyl, and like silane groups; halogen atoms (especially when remote from the reactive double bond), ether oxygen atoms (e.g., methoxy, ethoxy, phenoxy, etc. groups) or thioether sulfur atoms may be found acceptable.

Reaction between the aluminacycloalkene moiety and the olefinic compound coreactive therewith is conducted in the presence of a Lewis base having suitable chemical stability under the reaction conditions being utilized. Thus, the use of Lewis bases of the character and in the manner referred to in Section A above will be found efficacious. For example (and as noted in Section A) the reaction may be conducted in a suitable inert hydrocarbon medium so long as a suitable amount of the appropriate Lewis base is also copresent. Ordinarily the system should contain at least one mole of Lewis base per molar equivalent of aluminacycloalkene moiety being subjected to the reaction.

For the reaction under discussion, reaction temperatures between about 50° C. and about 200° C. will usually suffice, temperatures falling in the range of from about 100 to about 175° C. being preferred. Naturally one will select a reaction temperature at which excessive cleavage of the Lewis base does not occur. Depending upon the reactants, reaction medium and temperature used, the pressure may range from atmospheric pressure or below up to about 100 atmospheres or more. The reactions involving ethylene, propylene, and other gaseous coreactive olefinic hydrocarbons will best be conducted at elevated pressures in a closed reaction system such as an autoclave. When using ethylene, pressures in the range of from about 40 to about 70 atmospheres are desirable. The usual precautions for reactions of this character should be observed, e.g., the system should be kept essentially anhydrous and exposure to the atmosphere should be kept at a minimum.

The proportions of the cycloalkene moiety and the olefin coreactive therewith are susceptible to considerable variation inasmuch as the addition reaction generally occurs on a 1:1 basis. Consequently, either reactant may be present in a considerable excess relative to the other reactant, or the reactants may be present in essentially equimolar proportions. Since the olefinic reactant is often the less expensive reactant, it frequently will be used in excess relative to the aluminacycloalkene reactant.

By use of this process (or the in situ processes discussed elsewhere in this disclosure) a large number of novel vinylic aluminacycloalkane moiety containing compounds can be produced. A few such compounds are as follows:

1-isobutyl-3-isopropenyl-aluminacyclopentane diethyl etherate
1-isobutyl-3-vinyl-3-methyl-aluminacyclopentane diethyl etherate
1-isobutyl-3-isopropenyl-aluminacyclopentane tetrahydropyranate
1-isobutyl-3-vinyl-3-methyl-aluminacyclopentane tetrahydropyranate
1-isobutyl-3-isopropenyl-aluminacyclopentane N-methyl-pyrrolidinate
1-isobutyl-3-vinyl-3-methyl-aluminacyclopentane N-methyl-pyrrolidinate
1-isobutyl-3-isopropenyl-aluminacyclopentane dioxanate
1-isobutyl-3-vinyl-3-methyl-aluminacyclopentate dioxanate
1-isobutyl-3-(1-ethylvinyl)-aluminacyclopentane dioxanate
1-isobutyl-3-vinyl-3-ethyl-aluminacyclopentane dioxanate
1-isobutyl-3-vinyl-aluminacyclopentane dioxanate
1-isobutyl-3-[1-(4-methyl-pent-3-enyl)vinyl]-aluminacyclopentane dioxanate
1-isobutyl-3-vinyl-3-(4-methyl-pent-3-enyl)-aluminacyclopentane dioxanate
1-ethyl-3-isopropenyl-aluminacyclopentane dioxanate
1-ethyl-3-vinyl-3-methyl-aluminacyclopentane dioxanate
1-phenyl-3-isopropenyl-aluminacyclopentane dioxanate
1-phenyl-3-vinyl-3-methy-aluminacyclopentane dioxanate
3-isobutyl-5-vinyl-3-aluminatricyclo[5.2.1.0$^{2,6}$]-decane dibutyl etherate
3-isopropyl-5-isopropenyl-1,7-dimethyl-3-aluminatricyclo [5.2.1.0$^{2,6}$]-decane dioxanate
3-decyl-5-(1-ethylvinyl)-3-aluminatricyclo[5.2.1.0$^{2,6}$]-dec-8-ene N-methyl pyrrolidinate
3,5-dimethyl-5-isopropenyl-3-aluminatetracyclo [5.5.1.0$^{2,6}$.0$^{8,12}$]-tridec-9-ene dioxanate (C) In situ formation of nonionicorganoaluminum compounds possessing aluminacycloalkene moiety and concurrent reaction of olefins therewith As pointed out above, one way of accomplishing this one-step operation is to effect a reaction among aluminum, a conjugated diene, a hydrocarbon aluminum hydride, and a suitable olefin (i.e., an olefin coreactive with the aluminacycloalkene moiety being formed in situ), all in the presence of a stable Lewis base. It will be clearly evident that this one-step process is, in effect, a combination of the preformation technology and the reaction technology discussed in detail under Sections A and B above, respectively. Thus, reference should be had to those sections for further details.

In passing, it should be noted that the temperature and pressure for this one-step procedure generally approximate the temperature and pressure when running the operation using preformed aluminacycloalkene moiety. Thus, one will normally choose the reaction temperatures and pressures discussed under Section B above.

As also pointed out above, another way of carrying out this one-step, in situ type process is to react the aluminum, the diene and the olefin along with hydrogen and an alkali metal aluminum tetrahydrocarbyl which itself may be formed in situ. Here again the process is conducted in the presence of the stable Lewis base, with or without an inert hydrocarbon reaction diluent. Thus, the reaction medium used in this one-step process will be of the type discussed in Section A above.

Suitable alkali metal tetrahydrocarbyls used in, or formed in situ for use in, this process are exemplified by sodium aluminum tetramethyl, sodium aluminum tetraethyl, sodium aluminum tetraisobutyl, sodium aluminum tetradecyl, sodium aluminum tetraoctadecyl, sodium aluminum diethyl diphenyl, sodium aluminum dicyclohexyl dibutyl, sodium aluminum ethyl trimethyl, lithium aluminum tetraethyl, lithium aluminum tetrahexyl, potassium aluminum tetraisopropyl, potassium aluminum tetradecyl, potassium aluminum tetraphenyl, and similar derivatives of rubidium or cesium.

The remaining substances used in conducting this operation are considered in detail in Sections A and B above. The reaction conditions (i.e., temperature and pressure) will generally correspond to those discussed in Section B.

(D) Illustrative uses for which the vinylic aluminacycloalkane moieties are suited On hydrolysis, the novel cyclic aluminum compounds of this invention liberate olefins. In many cases the structures of these olefins are quite rare, oftentimes unique. When the hydrolysis is effected under mild conditions (e.g., using water or moist air at low temperatures, e.g., 0–25° C.) the olefinic product liberated will have a terminal double bond. Many of these products may be copolymerized with ethylene in accordance with known Ziegler/Natta type technology in order to form a variety of polymers of differing physical properties. The olefins liberated on hydrolysis may also be used in preparing novel alkylated aromatic compounds, some of which may be of use in the manufacture of synthetic detergents (e.g., for dishwashing and laundry usage) and in the manufacture of lubricating oil additives. Some of the olefinic products may find use as fragrance materials and thus may be used as perfumes in connection with household detergents, shampoos, toilet bars and the like. Some of the products may be used either directly as, or as intermediates for the manufacture of germicides, insecticides, fungicides, insect repellants, water-proofing agents and plasticizers.

Another important use for the vinylic aluminacycloalkane moiety containing compounds of this invention is to subject them to controlled oxidation with air, oxygen or air enriched with gaseous oxygen whereby a new class of oxygenated cyclic organoaluminum compounds is produced. By way of example, oxidation (air, 0° C., one hour, in 1,4-dioxane) of compounds of the general formula

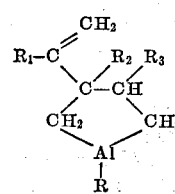

gives rise to the formation of compounds of the formula

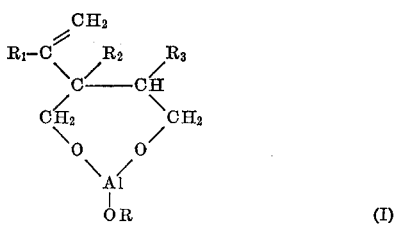

(I)

wherein R is a hydrocarbon group having up to about 18 carbon atoms (most preferably a lower alkyl group), and in the simplest cases, $R_1$ is hydrogen or an alkyl or alkenyl group, $R_2$ is hydrogen or an alkyl group, and $R_3$ is hydrogen or an alkyl, aryl or aralkyl group.

Similarly, controlled oxidation of a fused ring compound of the formula

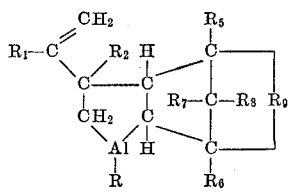

gives rise to the formation of compounds of the formula

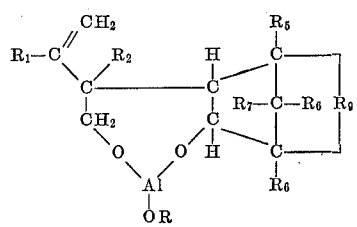

(II)

wherein, in the simplest situations, R is a hydrocarbon group having up to about 18 carbon atoms (most preferably a lower alkyl group), $R_1$ is hydrogen or an alkyl or alkenyl group, $R_2$ is hydrogen or an alkyl group, each of $R_5$, $R_6$, $R_7$, and $R_8$ is, individually, hydrogen or an alkyl group and $R_9$ is a divalent hydrocarbon radical, normally from 1 to 3 carbon atoms in length and containing from 1 to about 10 carbon atoms.

Hydrolysis of compounds of Formulas I and II above (e.g., using water or moist air at 0–25° C., preferably followed by treatment with dilute aqueous mineral acid) results in the formation and liberation of diols having the corresponding skeletal configuration. Many such diols have novel structures and interesting properties.

The vinylic aluminacycloalkane compounds of this invention may also be used in forming catalyst systems to be employed in the same general fashion as the conventional Ziegler catalyst systems. By way of example, these cyclic organoaluminum compounds may be used in conjunction with conventional transition metal containing catalyst ingredients (e.g., the halides, alkoxides, or chelates of titanium, zirconium, vanadium or the like) in much the same way as alkyl aluminum compounds are now used. Polymers which may be produced in this manner include polyethylene, polypropylene, ethyl-propylene copolymers and terpolymers, poly-4-methylpentene-1, and other olefin polymers and synthetic rubbers or elastomers.

I claim:

1. An organoaluminum compound posssssing a vinylic aluminacycloalkane moiety, the moiety being attached by means of an aluminum-carbon bond to a hydrocarbon group having up to about 18 carbon atoms.

2. A compound according to claim 1 wherein said moiety is a 3-vinyl-aluminacyclopentane moiety.

3. A compound according to claim 1 wherein said moiety is a 3-isopropenyl-aluminacyclopentane moiety.

4. A compound according to claim 1 wherein said moiety is a 3-(1-ethylvinyl)-aluminacyclopentane moiety.

5. A compound according to claim 1 wherein said moiety is a 3-isopropenyl-3-methyl-aluminacyclopentane moiety.

6. A compound according to claim 1 wherein said moiety is a 3-[1-(4-methyl-pent-3-enyl)vinyl]-aluminacyclopentane moiety.

7. A compound according to claim 1 wherein said moiety is a vinylic fused ring aluminacycloalkane moiety.

8. An organoaluminum compound of the formula

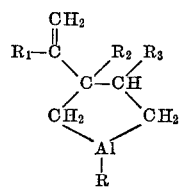

wherein R is a hydrocarbon group having up to about 18 carbon atoms, $R_1$ is hydrogen or an alkyl or alkenyl group, $R_2$ is hydrogen or an alkyl group, and $R_3$ is hydrogen or an alkyl, aryl or aralkyl group.

9. A compound according to claim 8 complexed with a Lewis base.

10. A compound according to claim 8 wherein R is a lower alkyl group.

11. A compound according to claim 8 wherein R is an isobutyl group.

12. An organoaluminum compound of the formula

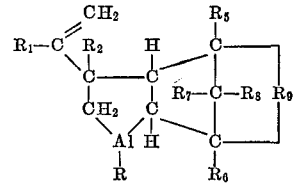

wherein R is a hydrocarbon group having up to about 18 carbon atoms, $R_1$ is hydrogen or an alkyl or alkenyl group, $R_2$ is hydrogen or an alkyl group, each of $R_5$, $R_6$, $R_7$ and $R_8$ is, individually, hydrogen or an alkyl group, and $R_9$ is a divalent hydrocarbon radical of from 1 to 3 carbon atoms in length and containing from 1 to about 10 carbon atoms.

13. A compound according to claim 12 complexed with a Lewis base.

14. A compound according to claim 12 wherein R is a lower alkyl group.

15. A compound according to claim 12 wherein R is an isobutyl group.

16. The compound:

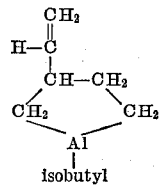

17. The compound:

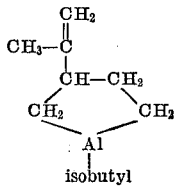

18. The compound:

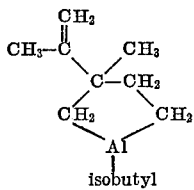

19. The compound:

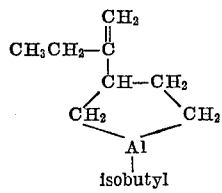

20. The compound:

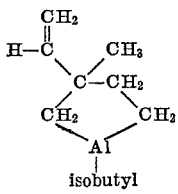

21. A process of preparing organoaluminum compounds possessing a vinylic aluminacycloalkane moiety which comprises reacting (i) a nonionic organoaluminum compound possessing an aluminacycloalkene moiety, the moiety being attached by means of an aluminum-carbon bond to a hydrocarbon group which optionally may be substituted by no more than an additional so-bonded aluminacycloalkene moiety, with (ii) an olefin coreactive therewith, the reaction being conducted in the presence of a stable Lewis base.

22. The process of claim 21 wherein the Lewis base is a tertiary amine, a dialkyl ether, a cycloparaffinic monoether having a six membered ring, or a cycloparaffinic diether having a five or six membered ring.

23. The process of claim 21 wherein the Lewis base is 1,4-dioxane.

24. The process of claim 21 wherein the aluminacycloalkene moiety is an aluminacyclopent 3-ene moiety having the formula

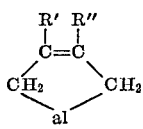

wherein R' is a hydrogen, alkyl ar alkenyl group, R" is a hydrogen or alkyl group, and al is two-thirds of an equivalent of aluminum.

25. The process of claim 21 wherein the olefin is an acyclic olefin of the formula

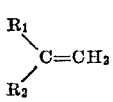

wherein $R_1$ is hydrogen or an alkyl group of up to about 16 carbon atoms and $R_2$ is hydrogen or methyl.

26. The process of claim 21 wherein the olefin is ethylene.

27. The process of claim 21 wherein the olefin is a polycyclic hydrocarbon containing at least one etheno bridge.

28. The process of claim 21 wherein said nonionic organoaluminum compound possessing an aluminacycloalkene moiety is formed in situ.

29. A process of preparing organoaluminum compounds possessing a vinylic aluminacycloalkane moiety which comprises causing interaction among aluminum, a conjugated diene, a hydrocarbon aluminum hydride, and an olefin coreactive with an aluminacycloalkene moiety, the reaction being conducted in the presence of a stable Lewis base.

30. The process of claim 29 wherein the Lewis base is a tertiary amine, a dialkyl ether, a cycloparaffinic monoether having a six membered ring, or a cycloparaffinic diether having a five or six membered ring.

31. The process of claim 29 wherein the Lewis base is 1,4-dioxane.

32. The process of claim 29 wherein the aluminum is activated aluminum.

33. The process of claim 29 wherein the hydrocarbon aluminum hydride is a dialkyl aluminum hydride.

34. The process of claim 29 wherein the hydrocarbon aluminum hydride is diisobutyl aluminum hydride.

35. The process of claim 29 wherein the conjugated diene is butadiene or butadiene substituted on either or both of the internal carbon atoms by an alkyl group.

36. The process of claim 29 wherein the olefin is an acyclic olefin of the formula

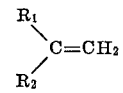

wherein R is hydrogen or an alkyl group of up to about 16 carbon atoms and $R_2$ is hydrogen or methyl.

37. The process of claim 29 wherein the olefin is a polycyclic hydrocarbon containing at least one etheno bridge.

38. The process of claim 29 wherein the conjugated diene is butadiene, isoprene, 2,3-dimethyl butadiene, 2-ethyl butadiene, or myrcene and the olefin is ethylene.

39. The process of claim 29 wherein the Lewis base is employed as the principal reaction solvent.

40. A process of preparing organoaluminum compounds possessing a vinylic aluminacycloalkane moiety which comprises causing interaction among aluminum, a conjugated diene, hydrogen, an olefin coreactive with an aluminacycloalkene moiety, and an alkali metal aluminum tetrahydrocarbyl, the reaction being conducted in the presence of a stable Lewis base.

41. The process of claim 4 wherein the Lewis base is a tertiary amine, a dialkyl ether, a cycloparaffinic monoether having a six membered ring, or a cycloparaffinic diether having a five or six membered ring.

42. The process of claim 40 wherein the conjugated diene is butadiene or butadiene substituted on either or both of the internal carbon atoms by an alkyl group.

43. The process of claim 40 wherein the olefin is an acyclic olefin of the formula

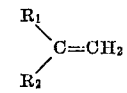

wherein $R_1$ is hydrogen or an alkyl group of up to about 16 carbon atoms and $R_2$ is hydrogen or methyl.

44. The process of claim 40 wherein the olefin is a polycyclic hydrocarbon containing at least one etheno bridge.

45. The process of claim 40 wherein the conjugated diene is butadiene, isoprene, 2,3-dimethyl butadiene, 2-ethyl butadiene, or myrcene, the olefin is ethylene and the Lewis base is a tertiary amine, a dialkyl ether, a cycloparaffinic monoether having a six membered ring or a cycloparaffinic diether having a five or six membered ring.

46. The process of claim 40 wherein said alkali metal aluminum tetrahydrocarbyl is formed in situ.

References Cited

UNITED STATES PATENTS

| 2,826,598 | 3/1958 | Ziegler et al. | |
| 3,260,730 | 7/1966 | Hubel et al. | 260—448 A X |
| 3,325,524 | 6/1967 | Lundeen | 260—448 A |
| 3,375,235 | 3/1968 | D'Alelio | 260—448 A X |
| 3,426,052 | 2/1969 | Hubel et al. | 260—448 A X |
| 3,493,623 | 2/1970 | Brendel | 260—448 A X |

FOREIGN PATENTS

| 1,302,748 | 7/1962 | France | 260—448 A |

TOBIAS E. LEVOW, Primary Examiner

H. M. S. SNEED, Assistant Examiner

U.S. Cl. X.R.

252—8.6, 431 R; 260—80.6, 80.78, 82.1, 88.2 B, 93.7, 94.9 B, 242, 270, 326.8, 340.6, 340.9, 448 A D, 677, 999

PO-1050
(5/69)

UNITED STATES PATENT OFFICE
CERTIFICATE OF CORRECTION

Patent No. 3,641,084                    Dated February 8, 1972

Inventor(s) Lawrence H. Shepherd, Jr.

It is certified that error appears in the above-identified patent and that said Letters Patent are hereby corrected as shown below:

Column 7 (in the TABLE), third column, fourth line after the heading reads "3-vinyl-4-(p-methoxypenyl)-alumina-", should read -- 3-vinyl-4-(p-methoxyphenyl)-alumina- --. Column 8 (in the TABLE), fourth column, last line reads "3,7-dimethyl-3-sopropyloctadiene-1,6.", should read -- 3,7-dimethyl-3-isopropyloctadiene-1,6. --.  Column 9, line 6 reads "aluminacryloalkene", should read -- aluminacycloalkene --. Column 10, line 19 (in the formula), the dash line "-" appearing to the left and slightly below the numeral "$_{10}$" should be deleted. Column 13, line 1 reads "comounds", should read -- compounds --; line 19 reads "processing", should read -- possessing --; line 70 reads "bicycle[3.2.0]hept-6-ene", should read -- bicyclo[3.2.0]hept-6-ene --. Column 14, line 9 reads
    "tricyclo[3.2.2$^{2,4}$]non-6-ene",
should read
    -- tricyclo[3.2.2.0$^{2,4}$]non-6-ene --; line 32 reading "an $R_4$ bridge one carbon atom in length (i.e., methylene," should be deleted in its entirety. Column 17, line 31, in Formula (II) reads "$R_7$-C-$R_6$", should read -- $R_7$-C-$R_8$ --; line 66 reads "posssing", should read -- possessing --. Column 20, line 36 reads "R", should read -- $R_1$ --; line 53 reads "claim 4 wherein", should read -- claim 40 wherein --.

Signed and sealed this 8th day of August 1972.

(SEAL)
Attest:

EDWARD M. FLETCHER, JR.          ROBERT GOTTSCHALK
Attesting Officer                 Commissioner of Patents

UNITED STATES PATENT OFFICE
CERTIFICATE OF CORRECTION

Patent No. 3,641,084                    Dated February 8, 1972

Inventor(s)    Lawrence H. Shepherd, Jr.

It is certified that error appears in the above-identified patent and that said Letters Patent are hereby corrected as shown below:

Column 1, between lines 53 and 54, insert the heading -- The Invention --.

Signed and sealed this 7th day of November 1972.

(SEAL)
Attest:

EDWARD M. FLETCHER, JR.
Attesting Officer

ROBERT GOTTSCHALK
Commissioner of Patents